US007370926B2

(12) United States Patent
Kato et al.

(10) Patent No.: US 7,370,926 B2
(45) Date of Patent: May 13, 2008

(54) LIQUID DROPLET EJECTION METHOD, HEAD UNIT, LIQUID DROPLET EJECTION DEVICE, ELECTRO-OPTICAL DEVICE, AND ELECTRONIC EQUIPMENT

(75) Inventors: Tsuyoshi Kato, Shiojiri (JP); Kazumi Aruga, Fujimi (JP)

(73) Assignee: Seiko Epson Corporation (JP)

( * ) Notice: Subject to any disclaimer, the term of this patent is extended or adjusted under 35 U.S.C. 154(b) by 35 days.

(21) Appl. No.: 11/420,114

(22) Filed: May 24, 2006

(65) Prior Publication Data

US 2006/0268037 A1 Nov. 30, 2006

(30) Foreign Application Priority Data

May 30, 2005 (JP) ............................ 2005-156717

(51) Int. Cl.
*B41J 29/38* (2006.01)
*G02F 1/1335* (2006.01)

(52) U.S. Cl. ........................................ 347/12; 349/104

(58) Field of Classification Search .................. 347/12, 347/43, 41, 15, 104, 106, 109
See application file for complete search history.

(56) References Cited

U.S. PATENT DOCUMENTS 5,568,169 A 10/1996 Dudek et al.
6,540,326 B2 * 4/2003 Matsubara et al. ........... 347/41

FOREIGN PATENT DOCUMENTS

| | | |
|---|---|---|
| JP | 2003-275650 | 9/2003 |
| JP | 2004-130299 | 4/2004 |
| JP | 2004-167326 | 6/2004 |
| JP | 2004-223339 | 8/2004 |
| JP | 2004-267927 | 9/2004 |
| JP | 2004-321891 | 11/2004 |

* cited by examiner

*Primary Examiner*—Lamson Nguyen
(74) *Attorney, Agent, or Firm*—Harness, Dickey & Pierce, P.L.C.

(57) ABSTRACT

A liquid droplet ejection method comprises: ejecting a liquid droplet of a functional liquids onto a substrate while scanning relatively the substrate and an ejection head. A plurality of kinds of functional liquids have different drying rates and are ejected onto respective different positions in respective scanning directions during the same scanning operation. Scanning regions of the plurality of kinds of the functional liquids at least partly are overlapped each other.

6 Claims, 14 Drawing Sheets

LIQUID DROPLET EJECTION METHOD, HEAD UNIT, LIQUID DROPLET EJECTION DEVICE, ELECTRO-OPTICAL DEVICE, AND ELECTRONIC EQUIPMENT

BACKGROUND OF THE INVENTION

1. Technical Field

The invention relates to a liquid droplet ejection method, a head unit, a liquid droplet ejection device, an electro-optical device, and electronic equipment 2. Related Art A liquid droplet ejection head of an ink-jet printer can eject a minute ink droplet in a dot shape, size of the ink droplet and uniformity of a pitch being highly accurate. This technique is applied to manufacturing fields of a wide variety of products. For example, application is made when forming a color filter of a liquid crystal device, a light-emitting section of an organic EL device, and the like.

Specifically, the liquid droplet ejection head is impregnated with special ink, photosensitive resin liquid (functional liquid) or the like, a droplet of which is ejected to a substrate for an electro-optical device (for example, refer to Japanese Unexamined Patent Publication No. 2004-267927). Since a color filter and a light-emitting section made by such method are often formed of a plurality of kinds of colors, it is designed such that the plurality of kinds of functional liquids are ejected by a different unit for each kind to the substrate.

Japanese Unexamined Patent Publication No. 2004-267927 is an example of related art.

However, according to the method disclosed in the related art, a different unit is used per kind to eject the plurality of kinds of the functional liquids, so that the total time required for ejecting takes long. On the other hand, if an attempt is made to eject the plurality of kinds of the functional liquids by one unit, because of different drying time for each functional liquid, uneven drying generates in the functional liquids, thus producing an uneven film to be formed.

SUMMARY

An advantage of some aspects of the invention is to provide a liquid droplet ejection method, a head unit, a liquid droplet ejection device, an electro-optical device, and electronic equipment which can shorten overall plotting time and prevent a film from being formed uneven.

According to a first aspect of the invention, a liquid droplet ejection method ejecting a liquid droplet of a functional liquid onto a substrate while scanning relatively the substrate and an ejection head, includes: ejecting a plurality of kinds of functional liquids having different drying rates onto respective different positions in respective scanning directions during the same scanning operation, while each scanning region of the plurality of kinds of the functional liquids at least partly overlapping each other.

According to the invention, since scanning regions of the plurality of kinds of the functional liquids having different drying rates at least partly overlap each other while scanning relatively the substrate and the ejection head, a portion where the scanning regions overlap each other is in an atmosphere difficult for drying because of evaporation of the plurality of kinds of functional liquids, and the drying rates of the functional liquids become uniform as a whole.

Consequently, even if the plurality of kinds of the functional liquids is ejected during the same scanning operation, no uneven drying occurs between each functional liquid.

This makes it possible to shorten the overall plotting time and to prevent unevenness from being produced in a film to be formed.

Further, it is preferable that of the plurality of kinds of the functional liquids, the functional liquid having a fast drying rate has a scanning region overlapping scanning regions of other kinds of the functional liquid.

According to the invention, as the scanning region of the functional liquid having a fast drying rate overlaps a scanning region of another kind of functional liquid, evaporation volume of a solvent evaporating from the functional liquids in the entire scanning region is averaged, so that a uniform solvent atmosphere can be formed. As a result, uniformity of the drying rates can be enhanced and uneven drying can be made difficult to occur between functional liquids.

Furthermore, it is preferable that the functional liquids be ejected in such a way as to make the scanning regions of the plurality of kinds of functional liquids all overlapped.

According to the invention, as the functional liquids are ejected in such a way that the scanning region of each kind of functional liquid all overlaps each other, the plurality of kinds of the functional liquids evaporate from all parts of the scanning regions to produce an atmosphere difficult to dry. This makes it possible for the drying rates of the functional liquids to be easily made uniform as a whole.

According to a second aspect of the invention, a head unit is a head unit ejecting liquid droplets of the functional liquids onto the substrate while scanning the substrate relatively, including: nozzles simultaneously ejecting the plurality of kinds of the functional liquids with different drying rates, while being arrayed such that each scanning region of the plurality of kinds of the functional liquids at least partly overlaps each other for ejection.

According to the invention, while scanning is performed relatively, ejection is made from the nozzles set up on the heads in such a manner that the scanning regions of the plurality of kinds of the functional liquids having different drying rates at least partly overlap each other.

Consequently, at the overlapping portion of the scanning regions, due to a solvent atmosphere which evaporated from the plurality of kinds of the functional liquids, there is a condition in which drying is made difficult, thereby making the drying rates of the functional liquids uniform as a whole.

This makes it possible to eject the plurality of kinds of the functional liquids simultaneously, while preventing uneven drying from occurring between each functional liquid even when the plurality of kinds of the functional liquids is simultaneously ejected.

According to a third aspect of the invention, a liquid droplet ejection device includes a head unit to be mounted thereon. According to the invention, there is installed the head unit which can eject the plurality of kinds of the functional liquids simultaneously, while preventing uneven drying from occurring between each functional liquid even when the plurality of kinds of the functional liquids is simultaneously ejected. Consequently, the overall plotting time can be shortened and the film formed is prevented from any unevenness.

According to a fourth aspect of the invention, an electro-optical device includes a substrate onto which the functional liquids are ejected according to the liquid droplet ejection method referenced above.

According to the invention, since the liquid droplets of the functional liquids are ejected by the liquid droplet ejection method which can shorten the overall plotting time and prevent unevenness from being produced on the formed film, production speed is improved, thus enabling many electro-optical devices to be produced and electro-optical devices of superior quality providing uniform display to be produced as well—in a short period of time.

According to a fifth aspect of the invention, electronic equipment includes being mounted with the above-referenced electronic-optical device.

According to the invention, since the electro-optical device of superior quality providing uniform display is mounted, electronic equipment excelling in display performance can be obtained.

BRIEF DESCRIPTION OF THE DRAWINGS

The invention will be described with reference to the accompanying drawings, wherein like numbers refer to like elements.

DESCRIPTION OF THE EMBODIMENTS

Electro-Optical Device

An embodiment of the invention will be described below with reference to the drawings. To provide each member in a recognizable size, scales in the following drawings are altered as necessary.

Figure 1:
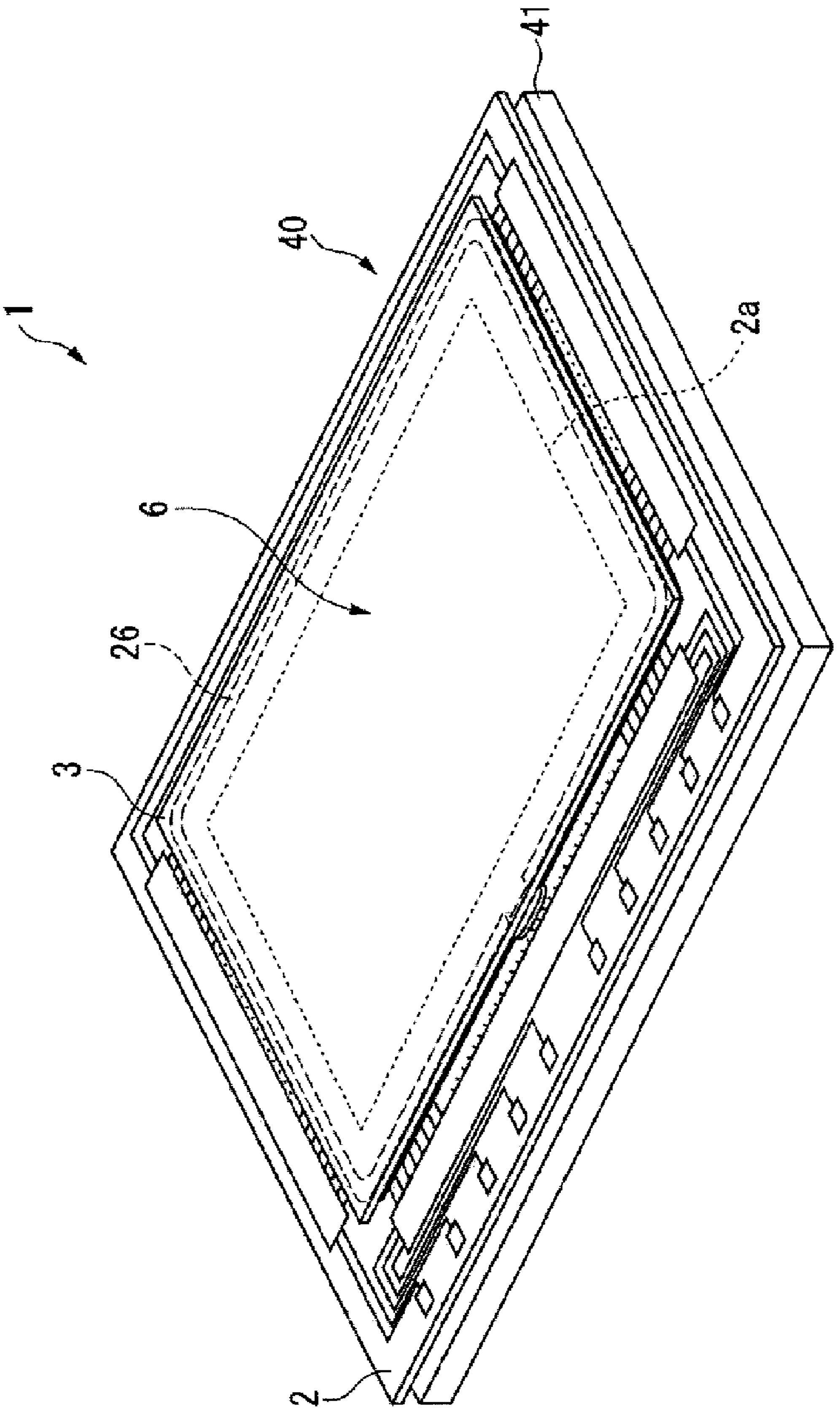
FIG. 1 is a perspective view showing configuration of a liquid crystal device according to an embodiment of the invention.

FIG. 1 is a perspective view showing configuration of a liquid crystal device 1 according to the embodiment.

As this diagram shows, a liquid crystal device 1 is mainly composed of a liquid crystal panel 40 and a backlight 41. The liquid crystal panel 40 is constructed such that it is made by gluing an active matrix substrate 2 to a color filter substrate 3 through a sealant 26 so as to hold a liquid crystal 6 between the active matrix substrate 2, the color filter substrate 3, and the sealant 26. A display region 2*a* shown in broken lines in the diagram is a region where images, moving images and the like are displayed.

The liquid crystal device 1 of the embodiment employs a liquid crystal device of the active matrix type using as a switching element a TFD (thin film diode) which is a two-terminal, nonlinear element. But a liquid matrix device of the passive matrix type is certainly acceptable.

Further, the liquid crystal panel 40 is formed by gluing and sectioning two large-sized motherboards (sectioning many units per board). As two motherboards, there are a color filter side motherboard generating a color filter substrate 3 and an active matrix side motherboard 2.

Figure 2A:
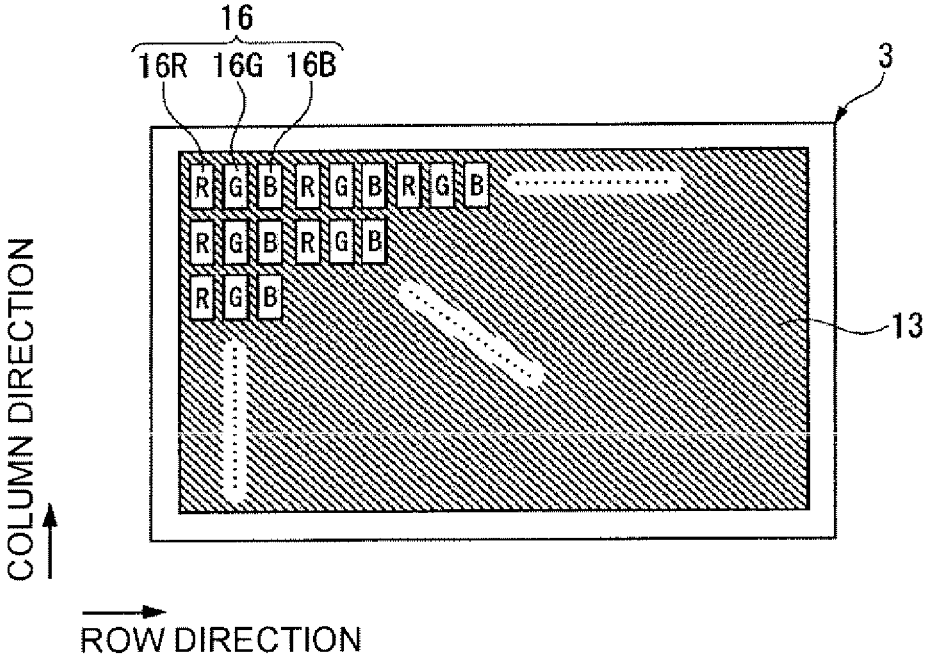
FIG. 2 is a plan view showing configuration of a color filter substrate according to the embodiment.
Figure 2B:
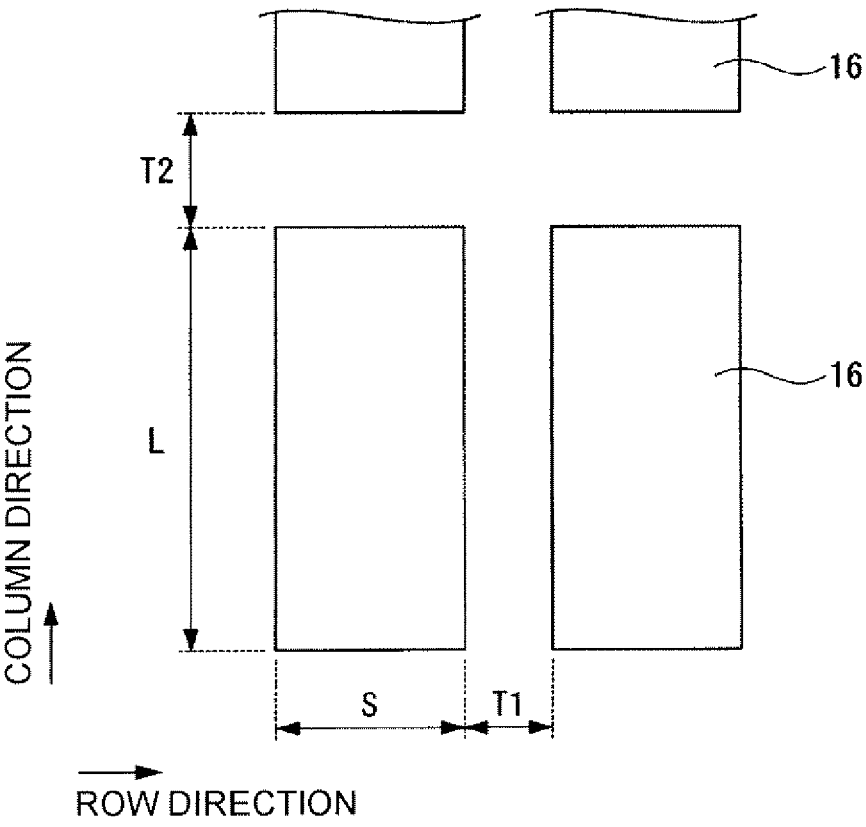

FIGS. 2A and 2B are plan views showing a configuration of the color filter substrate 3. FIG. 2A is a diagram showing the overall configuration of the color filter substrate 3 and FIG. 2B is a diagram showing a partly enlarged view of the color filter substrate 3.

As shown in FIG. 2A, the color filter board 3 is a rectangular substrate formed of, for example, a transparent material such as glass or plastics. On the color filter 3 is set up a light shielding layer 13 with provision of a color filter 16 having a red layer 16R, a green layer 16G, and a blue layer 16B corresponding to regions (pixels) surrounded by the light shielding layer 13.

Note that an overcoat layer (not illustrated) is formed on the color filter substrate 3 in a manner of covering the color filter board 16, and on the overcoat layer is formed an orientation film (not illustrated). The orientation film consisting of, for example, a material such as polyimide is a horizontal orientation film whose surface was subjected to rubbing processing.

Further, as shown in FIG. 2B, as for one read layer 16R (or the green layer 16G and the blue layer 16B), there is provided a rectangle, in which length S of a short side is, for example, approx. 170 μm, while length L of a long side is, for example, approx. 510 μm. Moreover, as for a pitch between one color filter 16 and another, pitch T1 in the row direction is set at about 20 μm, while pitch T12 in the column direction is set at about 40 μm.

Liquid Droplet Ejection Device

Next, a liquid droplet ejection device (hereinafter referred to as the "Ejection Device") 100 of the embodiment will be described.

Figure 3:
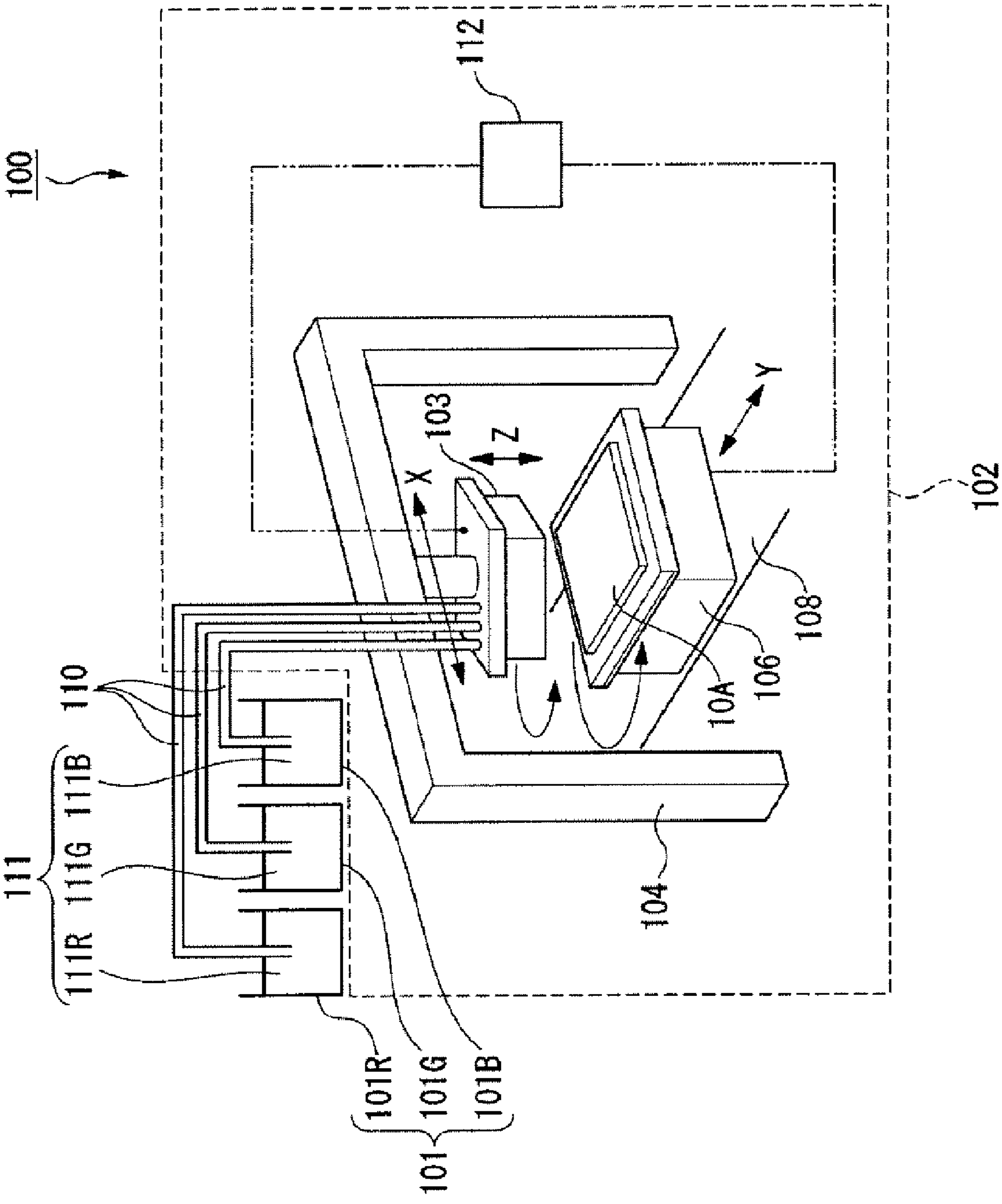
FIG. 3 is a perspective view showing an overall configuration of a liquid droplet ejection device according to the embodiment.

As shown FIG. 3, the ejection device 100 is constituted by a tank 101 holding a liquid material 111 and an ejection scanning unit 102 to which the liquid material 111 is supplied through a tube 110 from the tank 101.

There are three kinds of the liquid material 111, for example, a material 111R (hereinafter referred to as the "Red Material") constituting the red layer 16R, a material 111G (hereinafter referred to as the "Green Material") constituting the green layer 16G, and a material 111B (hereinafter referred to as the "Blue Material") constituting the blue layer 16B—all of the color filter 16 of the liquid crystal device 1.

The tank 101 has a red material tank 101R holding the red material 111R, a green material tank 101G holding the green material 101G, and a blue material tank 101B holding the blue material 101B in such a way as to hold the three kinds of the liquid material 111 individually.

To each tank 101 is attached, for example, a pressure pump which is not illustrated. As the pressure pump drives to apply pressure into the tank 101, the liquid material 111 is designed to be supplied from inside the tanks 101 to the ejection scanning unit 102.

At this point, as the red material 111R, there is used a solution, to which butylcalbitolacetate is added after, for example, a red inorganic pigment (for example, red ferric oxide, cadmium red, or the like) is dispersed in polyurethane oligomer, and to which a non-ionic surfactant is further added as a dispersant so that viscosity is adjusted within a preset range.

Further, as the green material 111G, there is used a solution, to which cyclohexanone and butyl acetate are added after, for example, a green inorganic pigment (for example, chromium oxide green, cobalt green, or the like) is dispersed in polyurethane oligomer, and to which a non-ionic surfactant is further added as a dispersant so that viscosity is adjusted within the preset range.

Furthermore, as the blue material 111B, there is used a solution, to which butylcalbitolacetate is added after, for example, a blue inorganic pigment (for example, ultramarine blue, Prussian blue, or the like) is dispersed in polyurethane oligomer, and to which a non-ionic surface reactant is further added as a dispersant so that viscosity is adjusted within the preset range.

Of these materials, cyclohexanone and butyl acetate used in the green material 111G tend to evaporate by comparison to butylcalbitolacetate used in the red material 111R and the blue material 111B. Since the drying rate of the liquid material 111 depends upon solvent's ease of evaporation, the drying rate of the green material 111G is larger than the drying rates of other liquid materials of the liquid material 111, so the green material 111G tends to dry. Note that the drying rate of the liquid material 111 depends on concentration of a solid portion, in addition to the solvent's ease of evaporation.

The ejection scanning unit 102 is constituted by a carriage 103 holding a plurality of heads 114 (refer to FIG. 4), a carriage position control 104 controlling a carriage 103 position, a stage 106 holding a base 10A which constitutes a color filter side motherboard, a stage position control 108 which controls a stage 106 position, and a control 112.

Note that there is actually a plurality (for example, 10 units) of carriages 103 set up on the ejection device 100. In FIG. 3, to simplify description, one carriage 103 is illustrated and described.

The carriage position control 104, in response to a signal from the control 112, moves the carriage 103 along x-axis direction or z-axis direction, while, at the same time, having a function to rotate the carriage 103 in a rotary direction with z-axis as an axis.

The stage position control 108, in response to a signal from the control 112, moves the stage 106 along the y-axis direction, while, at the same time, having a function to rotate this stage 106 in the rotary direction within z-axis as the axis.

As referenced above, the carriage 103 is designed to move in the x-axis direction as controlled by the carriage position control 104. On the other hand, the stage 106 is designed to move in the y-axis direction as controlled by the stage position control 108. Namely, a position of the head 114 relative to the stage 106 is designed to change according to the carriage position control 104 and the stage position control 108.

Namely, by moving both or either one of the carriage position control 104 or the stage position control 108, the carriage 103 is designed capable of scanning the stage 106 (or the base 10A held by the stage 106). In the embodiment, a case where scanning is performed by stopping the carriage 103 and moving the stage 106 will be described as follows.

Figure 4:
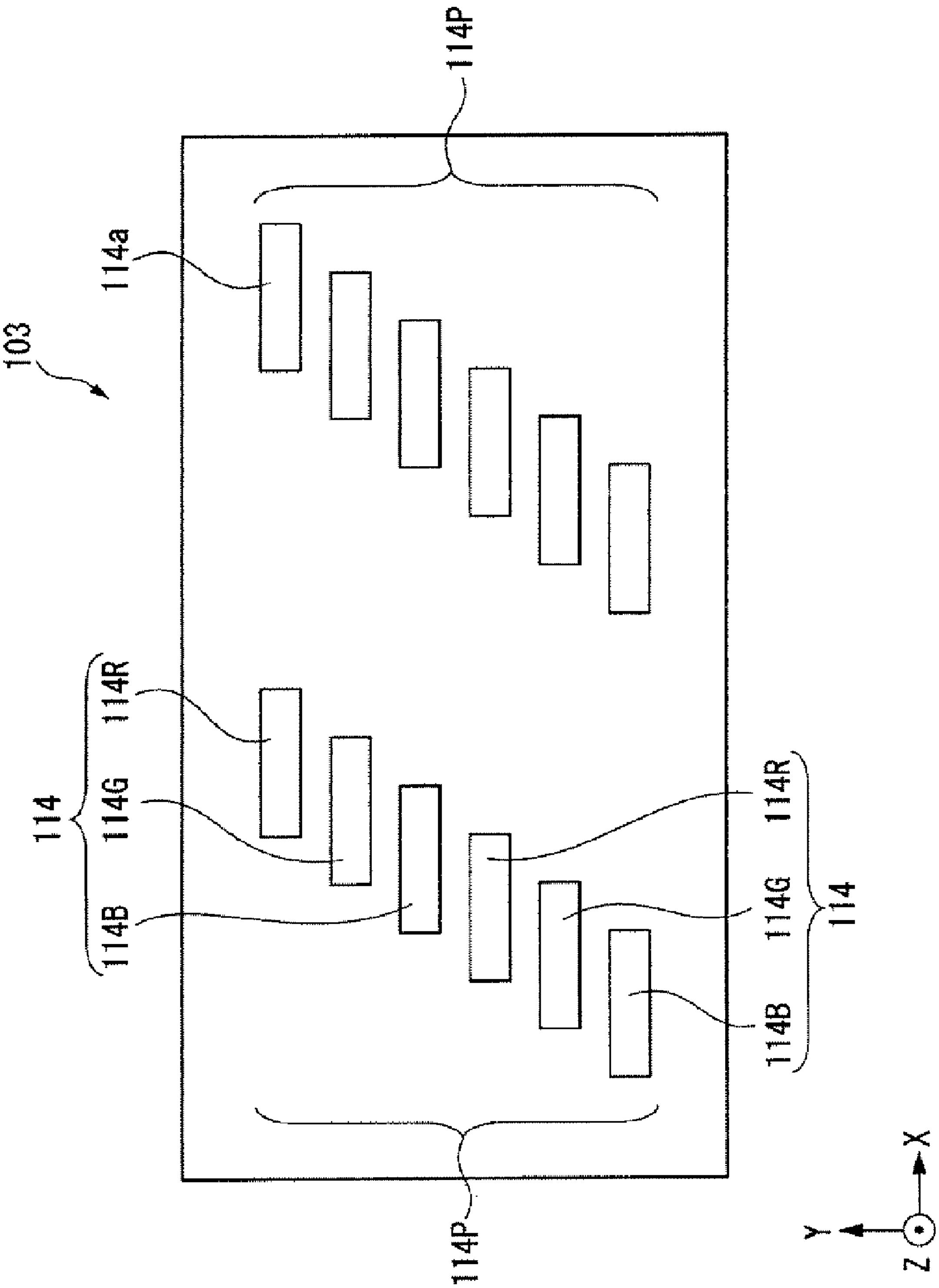
FIG. 4 is a plan view showing configuration of a carriage of a liquid droplet ejection device according to the embodiment.

FIG. 4 is a diagram of one carriage 103 viewed from the stage 106 side, a direction perpendicular to a page space of FIG. 4 is the z-axis direction. Further, a left to right direction of the page space of FIG. 4 is the x-axis direction, and an up and down direction of the page space is the y-axis direction.

As shown in this figure, the carriage 103 has a plurality of heads 114 respectively having substantially the same structure. The head 114 is available in three kinds, a head 114R ejecting the red material 111R from the liquid material 111, a head 114G ejecting the green material 111G, and a head 114B ejecting the blue material 111B.

In the embodiment, four heads each of the head 114R, the head 114G, and the head 114B are provided in one carriage 103, the number of the heads 114 totaling 12. Note that a positional relationship among the heads 114 will be described later. In this specification, four heads 114 adjacent to the y-axis direction may be denoted as the "head group 114P".

Figure 5:
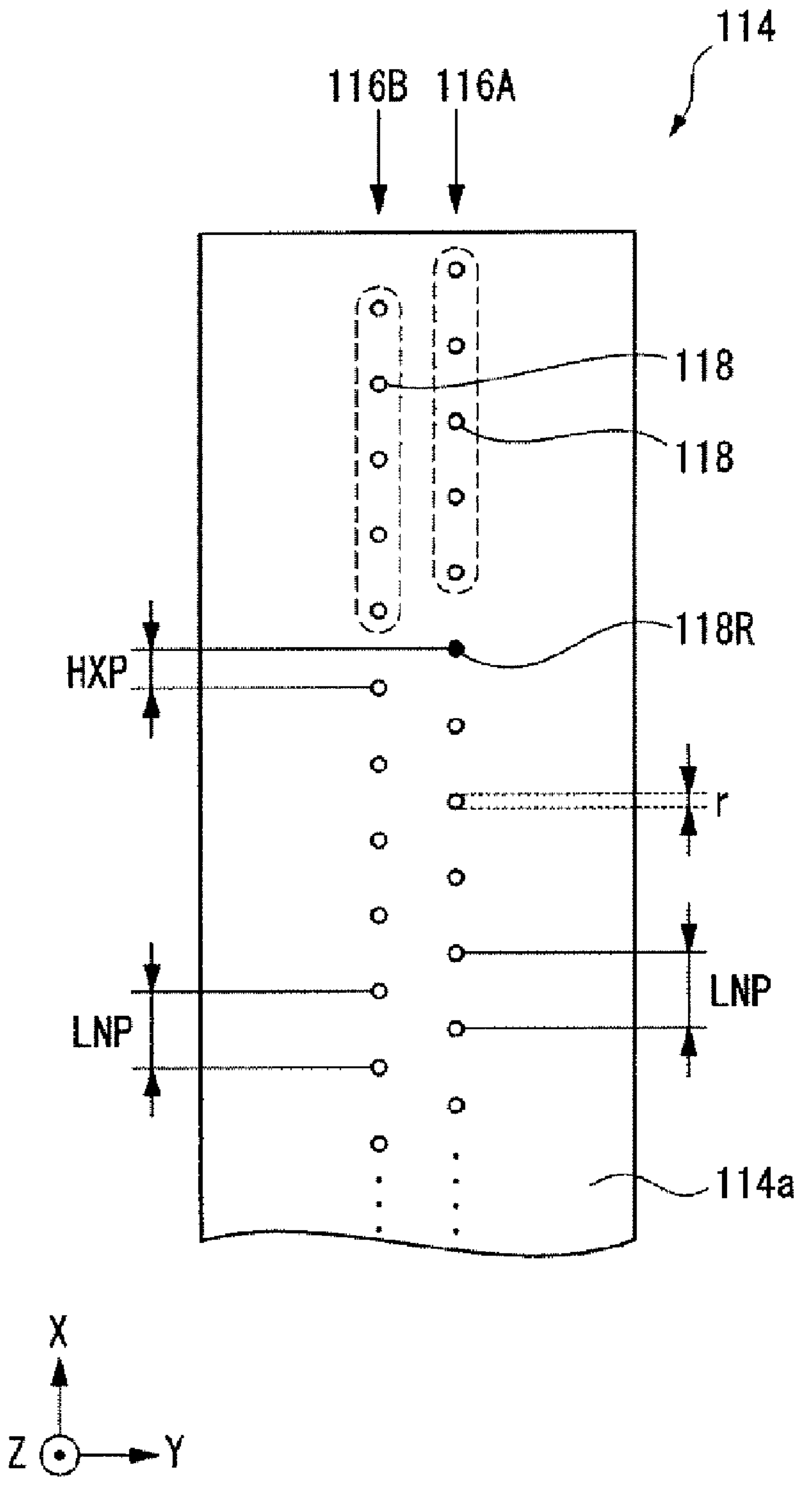
FIG. 5 is a plan view showing external configuration of a head of a liquid droplet ejection device according to the embodiment.

FIG. 5 is a diagram showing an underside 114*a* of the head 114. The shape of the underside 114*a* is a rectangle having two opposite long sides and two opposite short sides. The underside 114*a* faces the stage 106 side (z-axis direction in the figure). The long side direction and the x-axis direction in the figure of the head 114 as well as the short side direction and the y-axis direction in the figure of the head 114 are respectively parallel.

Further, upon the underside 114*a*, there are arranged in the x-axis direction, for example, two columns (column 116A and column 116B) of the nozzles 118, 90 units per column. Furthermore, nozzle diameter r of each nozzle 118 is set at approx. 30 μm. The nozzle 118 on the column 116A side and the nozzle 118 on the column 116B side are arranged at a preset pitch LNP (LNP: approx. 140 μm). Moreover, a position of each nozzle 118 of the nozzle column 116B is arranged to deviate to a negative x-axis direction (downward in FIG. 5) by half length (approx. 70 μm) of the nozzle pitch NLP in relation to each nozzle 118 position of the nozzle column 116A.

It should be noted that the nozzle column to be set up on the head 114 does not need to be two columns. For example, the number of columns may increase in such a way as 3 columns, 4 columns . . . M columns (M being a natural number), or it may be just 1 column.

Since each of the nozzle column 116A and the nozzle column 116B consists of 90 nozzles, 180 nozzles are provided on one head 114. However, it is designed such that the liquid material will not be ejected from both ends of the nozzle column 116A to the fifth nozzle (suspended nozzles being a portion enclosed in a broken line in FIG. 5). Likewise, nozzles from both ends of the nozzle column 116B to the fifth nozzle are suspended nozzles from which no liquid material 111 is ejected (suspended nozzles being a portion enclosed in a broken line in FIG. 5).

Consequently, of the 180 nozzles 118 on the head 114, 160 nozzles 118 excluding 20 nozzles on both ends are designed to eject the liquid material 111 (ejection nozzles).

In this specification, for purposes of describing the positional relationship of the head 114, of the 90 nozzles 118 included in the nozzle column 116A, the sixth nozzle 118 from an upper end in the figure is denoted as the "reference nozzle 118R".

Namely, of the 80 ejection nozzles in the nozzle column 116A, the ejection nozzle positioned at the uppermost position in the figure is the "reference nozzle 118R" of the head 114. Note that so long as the method of designating the "reference nozzle 118R" is the same with respect to all heads 114, the position of "reference nozzle 118R" does not need to be as referenced above.

Figure 6A:
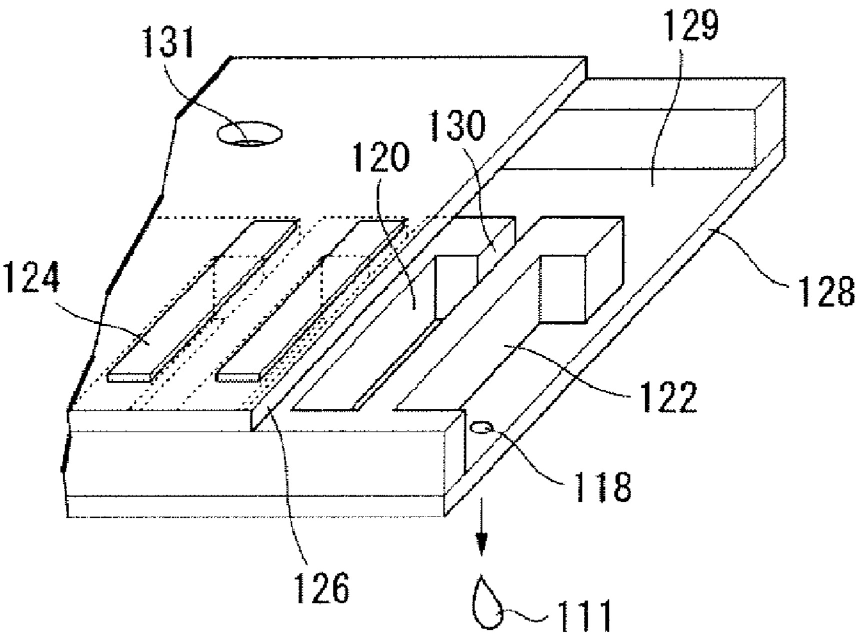
FIG. 6 is a diagram showing internal configuration of a head of a liquid droplet ejection device according to the embodiment.
Figure 6B:
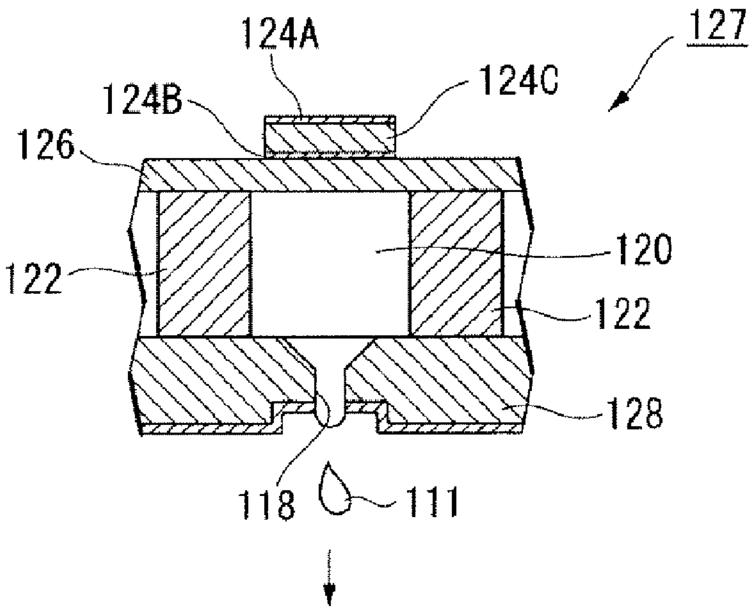

Next, configuration of the inside of the head 114 will be described. As shown in FIG. 6A and FIG. 6B, each head 114 is an ink-jet head. To be more specific, each head 114 comprises a vibration plate 126 and a nozzle plate 128. Between the vibration plate 126 and the nozzle plate 128 is set up a liquid pool 129 filled at all times with the liquid material 111 which is supplied through an opening 131 from the tank 101.

Further, between the vibration plate 126 and the nozzle plate 128 are set up a plurality of bulkheads 122. And a portion surrounded by the vibration plate 126, the nozzle plate 128, and a pair of bulkheads 122 is a cavity 120. The cavity 120 is provided per nozzle 118, and the number of the cavity 120 and the number of the nozzle 118 are the same. To the cavity 120 is supplied the liquid material 111 from the liquid pool 129 through a supply port 130 provided between the pair of the bulkheads 122.

On the vibration plate 126, a vibrator 124 is positioned corresponding to each cavity 120. The vibrator 124 includes a piezo-electric element 124C and a pair of electrodes 124A and 124B grasping the piezo-electric element 124C. By impressing the drive voltage between this pair of the electrodes 124A and 124B, the liquid material 111 is ejected from the corresponding nozzle 118.

It should be noted that the shape of the nozzle 118 is adjusted such that the liquid material is ejected from the nozzle 118 to the z-axis direction. Note, also, that in lieu of the piezo-electric element, an electric heat conversion element may be included. Namely, there may be a configuration by which to eject the liquid material 111 using thermal expansion of the material through the electric heat conversion element.

Next, configuration of the control 112 will be described.

The control 112 is a member for supervising and controlling operation of the ejection device 1 such as timing of ejecting the liquid material 111, a fixed position of the carriage 103, and moving the stage 106 (moving rate, moving distance and the like).

Figure 7:
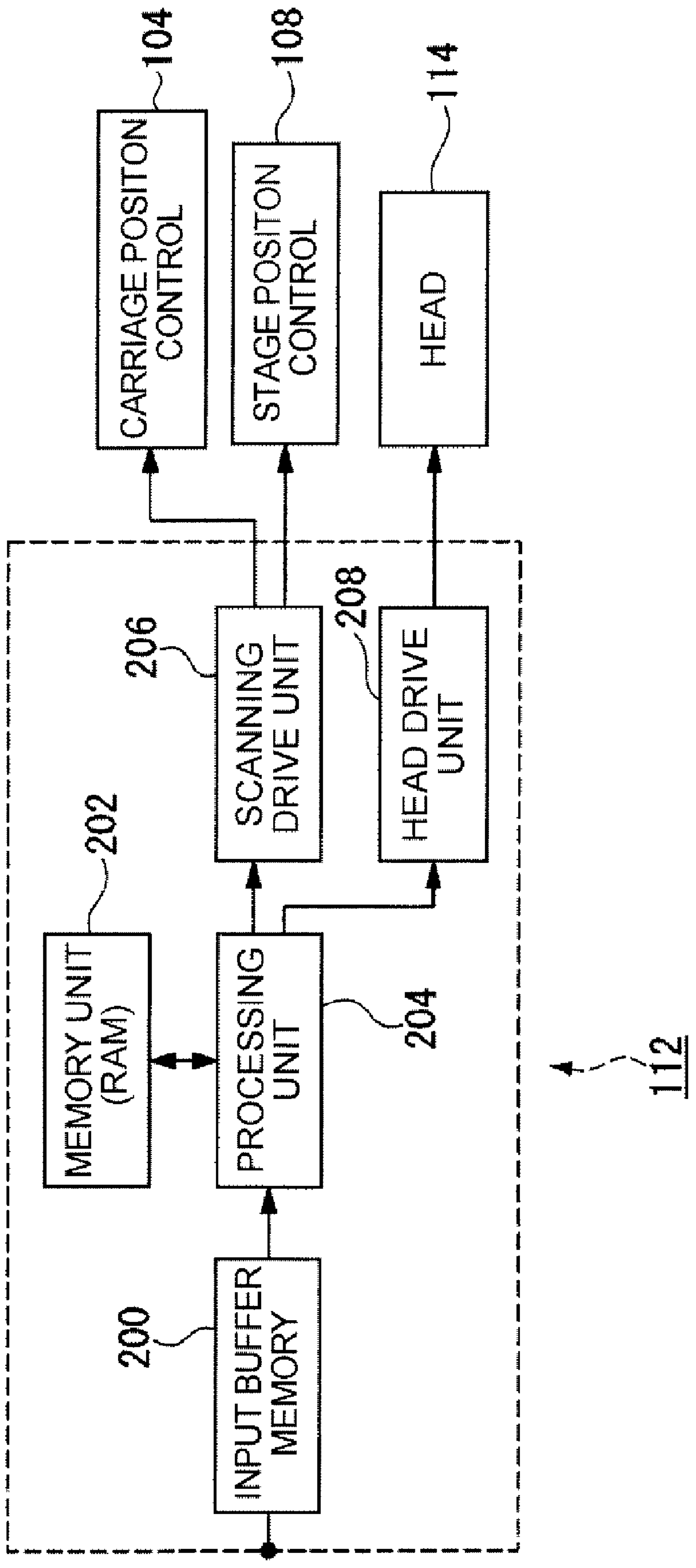
FIG. 7 is a block diagram showing configuration of a control of a liquid droplet ejection device according to the embodiment.

As shown in FIG. 7, the control 112 consists of an input buffer memory 200, a memory unit 202, a processing unit 204, a scan drive unit 206, and a head drive unit 208, connections being such as to enable communications between one unit to another.

The input buffer memory 200 receives ejection data to carry out ejection of liquid droplets of the liquid material 111 from a device externally connected such as an information processing unit. The input buffer memory 200 supplies the ejection data to the processing unit 204, while the processing unit stores the ejection data in the memory unit 202. As the memory unit 202, for example, a RAM or the like is employed.

The processing unit 204 accesses the ejection data stored in the memory unit 202, supplying a necessary drive signal based on the ejection data to the scan drive unit 206 and the head drive unit 208.

The scan drive unit 206, based on the drive signal, supplies a preset position control signal to the carriage position control 104 and the stage position control 108. Further, the head drive unit 208, based on the drive signal, supplies an ejection signal to each head 114 to eject the liquid material 111.

Figure 8A:
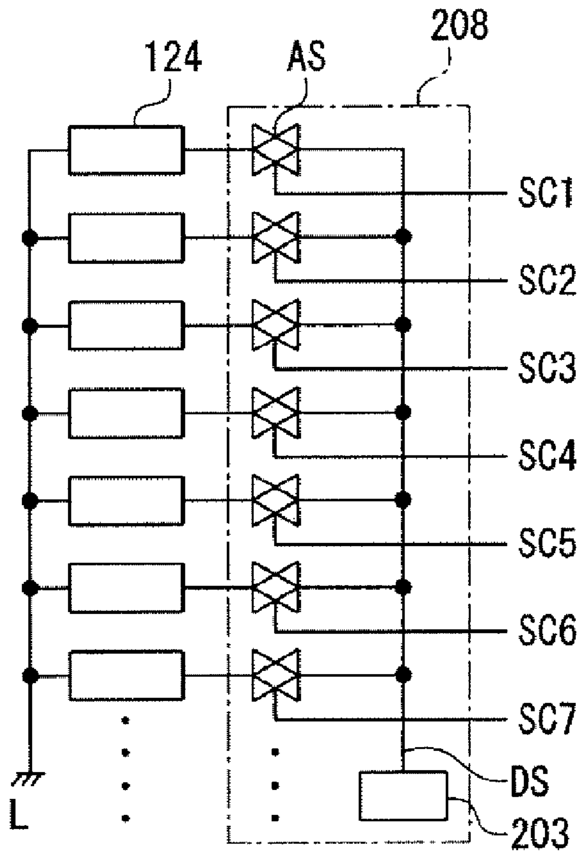
FIG. 8 is a diagram showing configuration of a head drive unit of a liquid droplet ejection device according to the embodiment.

As shown in FIG. 8A, the head drive unit 208 has one drive signal generating part 203 and a plurality of analog switches AS. The analog switch AS is connected to the vibrator 124 in the head 114 (specifically, it is connected to the electrode 124A, but, the electrode 124A is not illustrated in FIG. 8A).

The analog switch AS is set up to correspond to each nozzle 118, and the same number of it as the units of the nozzles 118 is provided.

Figure 8B:
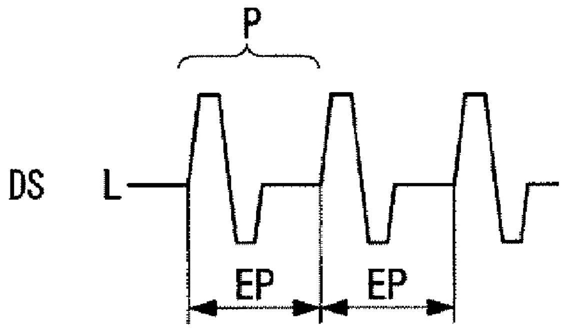

The drive signal generating part 203, as shown in FIG. 8B1, generates a drive signal DS. The drive signal DS is supplied independently to each input terminal of the analog switch AS. Potential of the drive signal DS changes in time with respect to a reference potential L. Namely, the drive signal DS is a signal in which a plurality of ejection waveforms P is repeated at an ejection frequency EP.

The ejection frequency EP is designed, for example, to be adjusted to a preset value by the processing unit 204. By adjusting this ejection frequency EP properly, it is possible to generate an ejection signal so that the liquid material 111 is simultaneously ejected from the plurality of nozzles 118.

Further, it is possible to generate an ejection signal so that the liquid material 111 is ejected from the plurality of nozzles 118 in different timing. In this manner, the ejection timing can be controlled.

Further, the control 112 is able to control not only the ejection timing but also volume of the liquid material 111 ejected from the nozzle 118. Control of the volume of the liquid material 111 is set so as to be able to control each nozzle 118 individually. As for the volume of the liquid material 111 ejected from each nozzle 118, it is variable between 0 picoliter and 42 picoliter.

It should be noted that the control 112 may be a computer including a CPU, a ROM, and a RAM. In this case, the function of the control 112 referenced above is realized by a software program executed by the computer. Naturally, the control 112 may be realized by an exclusive circuit (hardware).

Next, the positional relationship of six heads 114 in the head group 114P will be described.

Figure 9:
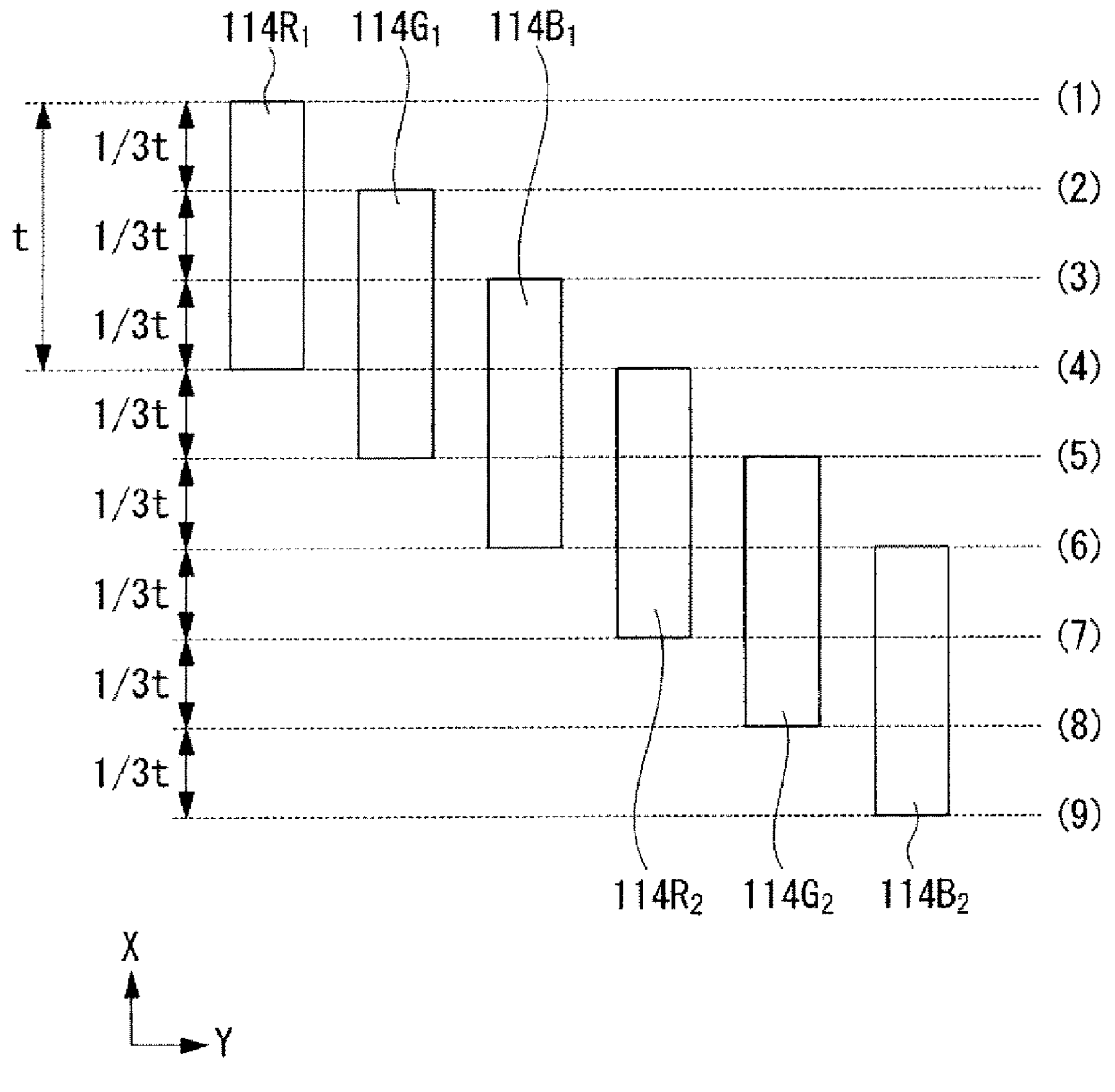
FIG. 9 is a diagram showing arrangement of a head of a liquid droplet ejection device according to the embodiment.

FIG. 9 is a diagram showing a relative positional relationship of the heads 114. Now, in this diagram, in regard to two pairs of heads 114R, 114G, and 114B shown in FIG. 4, they are respectively denoted as heads 114$R_1$, 114$G_1$, and 114$B_1$, and heads 114$R_2$, 114$G_2$, and 114$B_2$ and are distinguished as such.

As shown in FIG. 9, the head group 114P is arranged so that adjacent heads 114 mutually deviate in the x direction. For example, an effective nozzle column of the head 114$G_1$ adjacent to 114$R_1$ is provided to deviate in the x direction for ⅓ of a length of its effective nozzle column length t with respect to the effective nozzle column length of the head 114$R_1$.

At this point, the effective nozzle column length refers to a length of a portion of the head 14 (effective nozzle column: a portion between the reference nozzles 118R in the figure), where the ejection nozzles 118 ejecting the liquid material 111 are arranged.

This nozzle column length can be set, for example, about 1 inch. Note that in FIG. 9, to simplify explanation, description is made on the assumption that the ejection nozzles 118 are formed over an entire width of the nozzle.

Likewise, as for the effective nozzle column of the head 114$B_1$ adjacent to the head 114$G_1$, it is provided to deviate in the x direction for ⅓ of the length of its effective nozzle column length t with respect to the effective nozzle column length of the adjacent head 114$G_1$. Likewise, as for each effective nozzle column of the head 114 $R_2$ adjacent to the head 114$B_1$ or the head 114 $G_2$ adjacent to the head 114$R_2$ or the head 114 $B_2$ adjacent to the head 114$G_2$, it is set so that the effective nozzle column of respective heads 114 is provided to deviate in the x direction for ⅓ of the length of its effective nozzle column length with respect to the effective nozzle column length of each adjacent head 114.

As a result, a position of an end part of an upper side in the figure in the x direction of the effective nozzle column set on the head 114$R_2$ is in agreement with a position of an end part of a lower side in the figure in the x direction of the effective nozzle column set on the head 114$R_1$ (position shown in a broken line (4) in the figure).

Further, the position of the end part of the upper side in the figure in the x direction of the effective nozzle column set on the head 114$G_2$ is in agreement with the position of the end part of the lower side in the figure in the x direction of the effective nozzle column set on the head 114$G_1$ (position shown in a broken line (5) in the figure).

Furthermore, the position of the end part of the upper side in the figure in the x direction of the effective nozzle column set on the head 114$G_2$ is in agreement with the position of the end part of the lower side in the figure in the x direction of the effective nozzle column set on the head 114$G_1$ (position shown in a broken line (6) in the figure).

Namely, a range of the x direction in which the red material 111R is ejected is a range of the x direction of respective effective nozzle columns of the head 114$R_1$ and 114 $R_2$, that is, a range between a broken line (1) and the broken line (7).

Further, the range of the x direction in which the green material 111G is ejected is the range of the x direction of respective effective nozzle columns of the head 114$G_1$ and 114 $G_2$, that is, the range between a broken line (2) and a broken line (8). Still further, the range of the x direction in which the blue material 111B is ejected is the range of the x direction of respective effective nozzle columns of the head 114$B_1$ and 114 $B_2$, that is, the range between a broken line (3) and a broken line (9).

Consequently, when the carriage 103 scans, the range between the broken line (1) and the broken line (2) is a scan region of only the red material 111R; the range between the broken line (2) and the broken line (3) is a region where the scan region of the red material 111R overlaps the scan region of the green material 111G; the range between the broken line (3) and the broken line (7) is a region where the scan region of the red material 111R, the scan region of the green material 111G, and the scan region of the blue material 111B all overlap; the range between the broken line (7) and the broken line (8) is a region where the scan region of the green material 111G overlaps the scan region of the blue material 111B; and the range between the broken line (8) and the broken line (9) is a scan region of only the blue material 111B. In this manner, the regions other than the region between the broken line (1) and the broken line (2) and the region between the broken line (8) and the broken line (9), are regions where the scan region of each liquid material 111 overlaps each other.

Manufacturing Process of Liquid Crystal Device (Liquid Droplet Ejection Method)

Next, a manufacturing process of a liquid crystal device 1 configured in this way will be described.

In the embodiment, there is described a method of collectively forming a plurality of liquid crystal devices by using a large-area motherboard, and separating it individually into the liquid crystal devices 1 by sectioning.

First, a forming process of the color filter side motherboard will be briefly described.

A base 10A is held on a stage 106 of an ejection device 100. On the base 10A is formed a part subject to receive ejection 18 (refer to FIG. 10 and the like for 18R, 18G, and 18B) holding the color filter 16. It is designed such that the red layer 16R is held in the part subject to receive ejection 18R, that the green layer 16G is held in the part subject to receive ejection 18G, and that the blue layer 16B is held in the part subject to receive ejection 18B.

Note that when holding the base 10A on the stage 106, it is adjusted such that a short side direction of the base 10A is in agreement with the x-axis direction, while a long side direction is in agreement with the y-axis direction.

Figure 10:
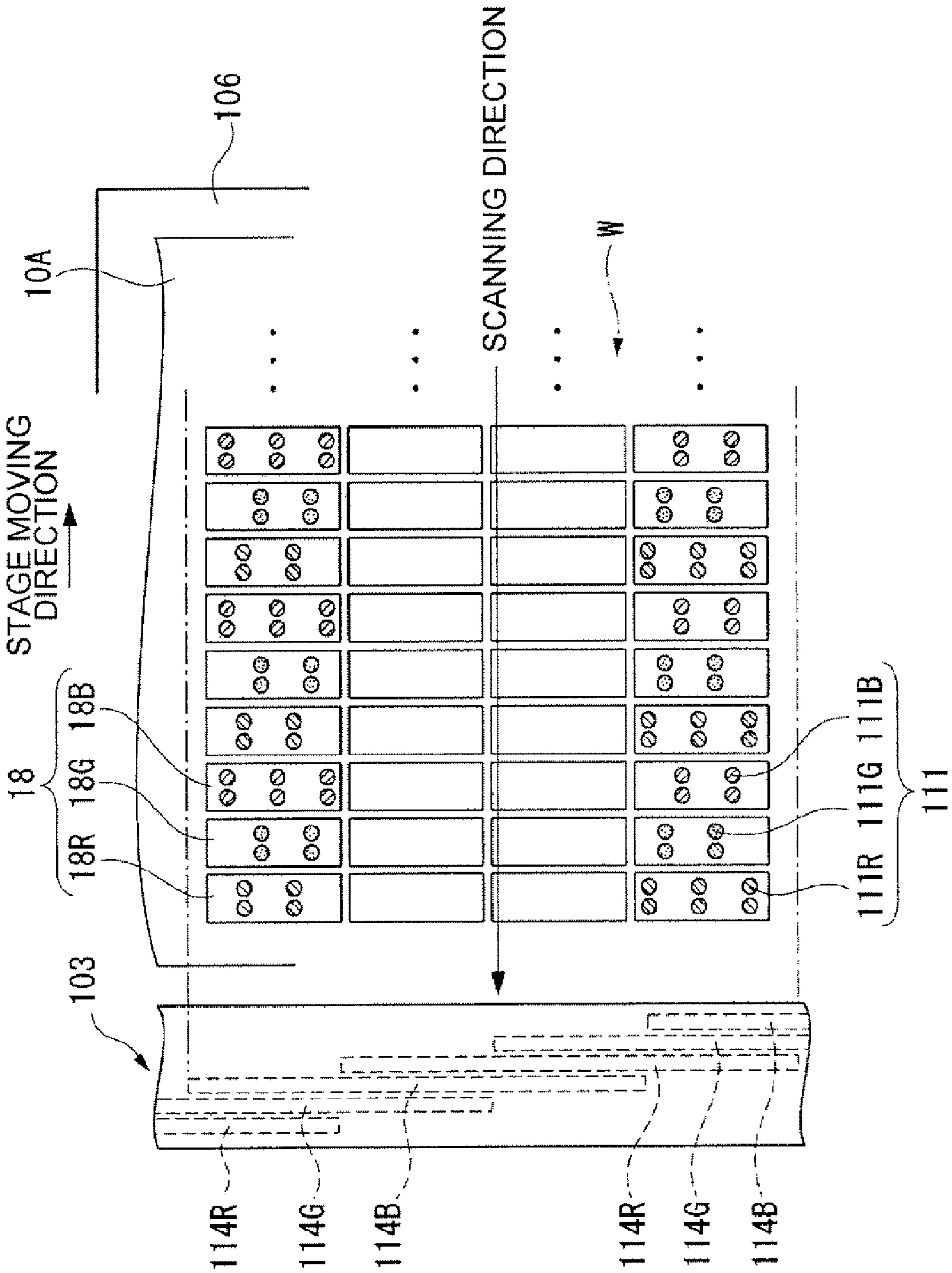
FIG. 10 is a diagram (1) showing operation of a liquid droplet ejection device according to the embodiment.

In this condition, the stage 106 is moved from the left side to the right side as shown in FIG. 10. The carriage 103 scans a region W (region sandwiched by one-dot chain lines) of the base 10A. At this time, the carriage 103 ejects the liquid materials 111 from each head 114 while scanning the region W of the base 10A.

From each head 114, the liquid materials 111 are simultaneously ejected. "Simultaneously ejected" does not mean ejection of one color per scan (in FIG. 10, for example, from the right side to the left side) but the ejection of the red material 111R from the head 114R, the ejection of the green material 111G from the head 114G, and the ejection of the blue material 111B from the head 114B per scan.

For example, by means of one scan, as shown in FIG. 10, for example, the red material 111R, the green material 111G, and the blue material 111B are ejected to each part subject to receive ejection 18 of the top row in the figure and each part subject to receive ejection 18 of the bottom row in the figure. At this time, it is possible to set, as appropriate, to which row of the part subject to receive ejection 18 that is set up over a plurality of rows the liquid materials 111 are to be ejected.

Figure 11:
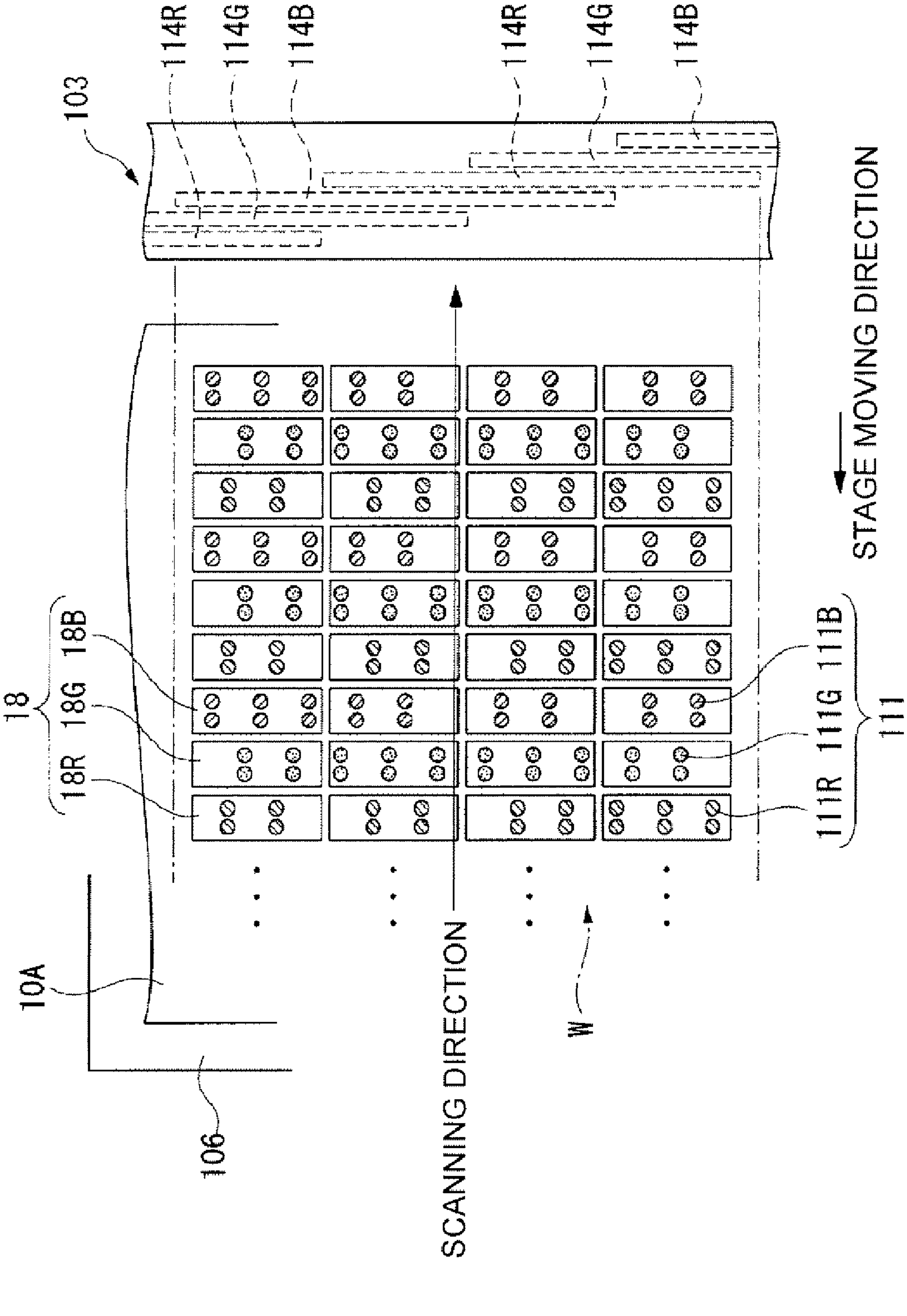
FIG. 11 is a diagram (2) showing operation of a liquid droplet ejection device according to the embodiment.

Next, scanning for the second time is carried out. Upon completion of the first time scan, the stage 106 has moved to the right side in the figure. In the second time scan, as shown in FIG. 11, the stage 106 is moved from the right side to the left side, while the carriage 103 scans in a direction opposite to the first time scan, that is, the region W of the base 10A from the left side to the right side in the figure. At this time, the liquid materials 111 are ejected from each head 114 while the carriage 103 is scanning the base 10A.

At the second time scan, the liquid materials 111 are ejected to the part subject to receive ejection 18 other than that part subject to receive ejection 18 to which the liquid materials 111 were ejected at the first-time scan. For example, as shown in FIG. 11, the red material 111R, the green material 111G, and the blue material 111B are ejected to each part subject to receive ejection 18 at the second row from the top in the figure, to which the liquid materials 111 were not ejected at the first-time scan, and to each part subject to receive ejection 18 at the second row from the top in the figure.

In this manner, in the scan after the second time, of the part subject to be ejected 18 set up over a plurality of rows, a row of the part subject to receive ejection 18 to which the liquid materials 111 are not ejected is selected and the ejection of the liquid materials 111 is carried out there. The scan is repeated until the liquid materials 111 are ejected to each part subject to receive ejection 18 for a total of one time each.

Figure 12:
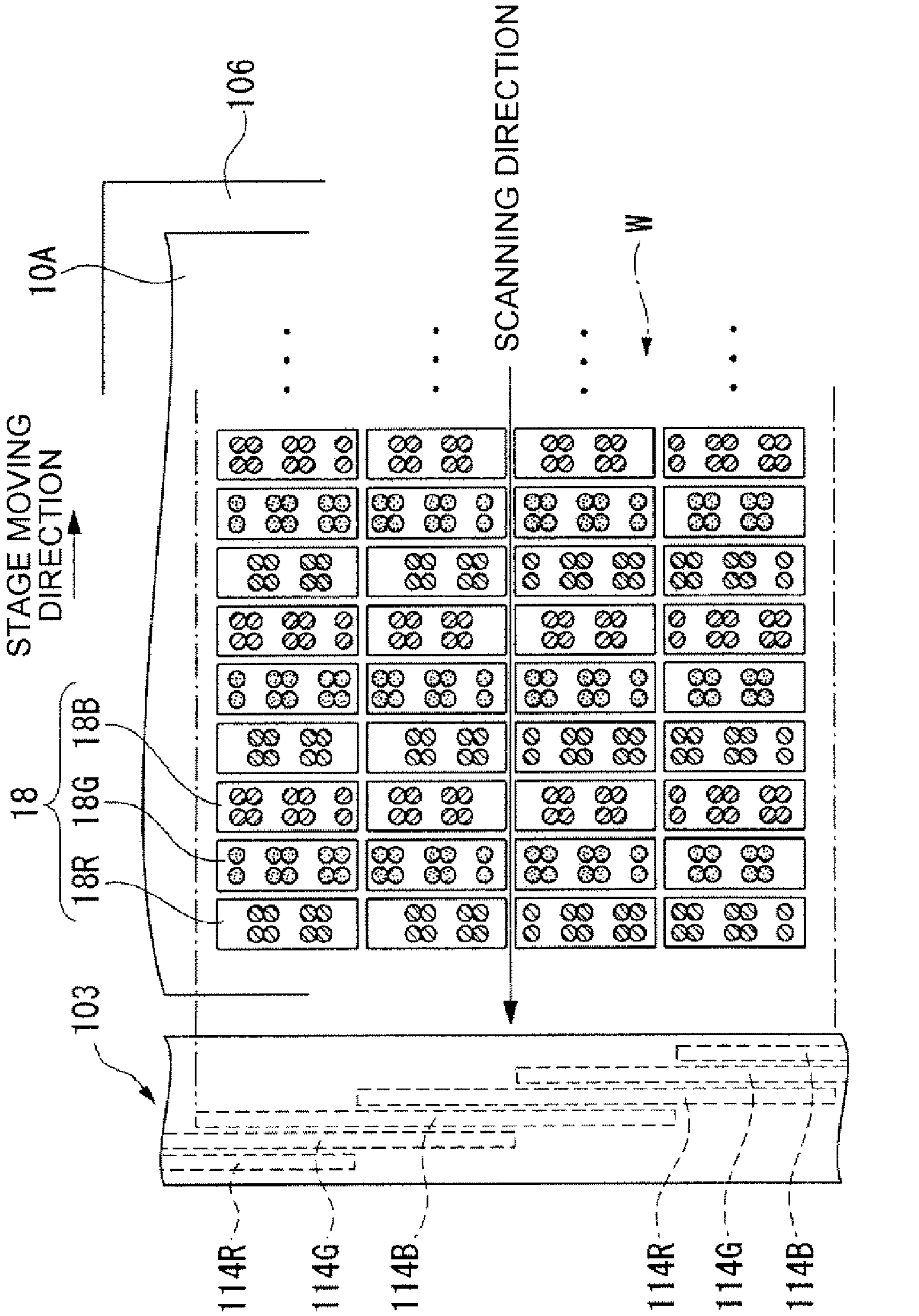
FIG. 12 is a diagram (3) showing operation of a liquid droplet ejection device according to the embodiment.
Figure 13:
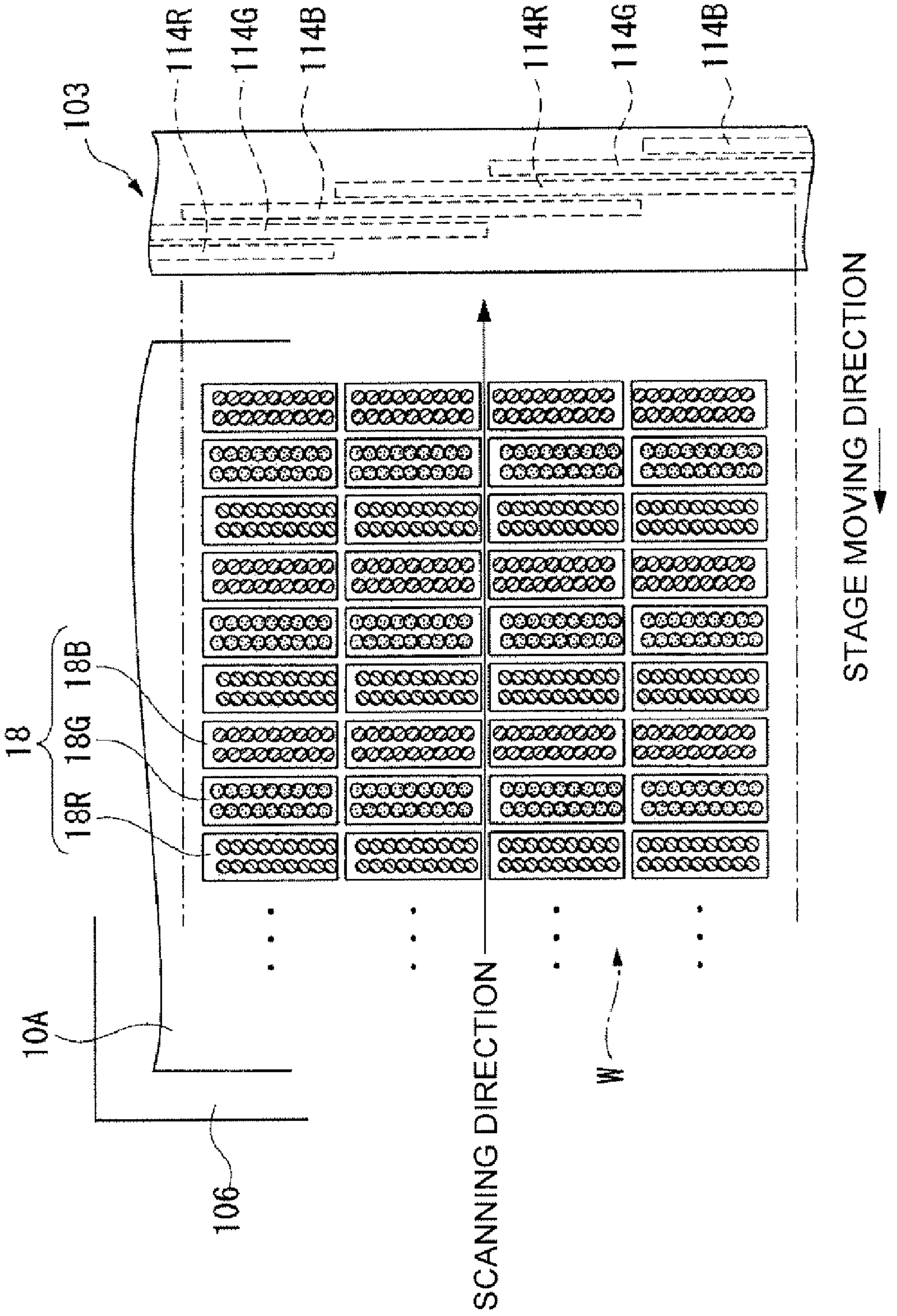
FIG. 13 is a diagram (4) showing operation of a liquid droplet ejection device according to the embodiment.

When the liquid materials 111 are ejected to each part subject to receive ejection 18 for the total of one time each, then, as shown in FIG. 12, the scan of FIG. 10 and FIG. 11 is repeated this time until the liquid materials 111 are ejected to each part subject to receive ejection 18 for the total of two times each. Thereafter, while repeating the scan, by gradually increasing the number of times of ejection, so that the liquid materials 111 are ejected to each part subject to receive ejection 18 for the total of three times each, four times each, and the like, as shown in FIG. 13, the liquid materials 111 are ejected to each part subject to receive ejection 18 as a whole.

Subsequent processes will be briefly described. On the base 10A on which the color filter 16 is formed, the electrodes, wiring and the like not illustrated are formed, thereby forming a leveled film. Further, on the surface of the base 10A are formed a spacer not illustrated for gap control and a bulkhead. In a manner of covering the wiring and the color filter formed on this base 10A, an orientation film is formed, and rubbing processing is applied to this orientation film.

The orientation film can be formed, for example, by coating or printing polyimide. Furthermore, a sealant composed of epoxy resin and the like is formed in a rectangular ring shape and liquid crystal is coated on a region surrounded by the sealant.

Next, in regard to formation of an active matrix side mother-board, there are formed the wiring, electrodes and the like on a large-sized base composed of a transparent material such as glass or plastics, and a leveled film is formed on a region formed by the wiring, electrodes and the like. When the leveled film is formed, the orientation film consisting of polyimide and the like is formed, and the rubbing processing is applied to this orientation film.

Next, the color filter side motherboard and the active matrix side motherboard are glued together in a panel shape. Both substrates are brought close to each other, so that the active matrix side motherboard is adhered to a sealant on the color filter side motherboard. Subsequently, a scribe line is formed on the both glued motherboards; a panel is sectioned along the scribe line; each sectioned panel is rinsed; and it is mounted with a drive driver and the like. A deflecting plate is glued to the outside surface of each liquid crystal panel and attached with a backlight 41, then, the liquid crystal device 1 is completed.

In this manner, according to the embodiment, while the carriage 103 is scanning over the base 10A, the liquid materials 111 are ejected such that at least part of the scan region of each liquid material 111 of the red material 111R, the green material 111G, and the blue material 111B overlaps each other. Hence, at the portion where the scan regions overlap, the solvent of each liquid material 111 evaporates to create an atmosphere which is difficult to dry, causing the overall drying rates of the liquid materials 111 to become uniform.

As a result, even if each liquid material 111 of the red material 111R, the green material 111G, and the blue material 111B is ejected during the same scanning, no uneven drying occurs between each liquid material 111. This makes it possible to shorten the overall plotting time and prevent uneven drying from occurring on the color filter layer 16 to be formed.

Further, as in the embodiment, by making the scan region of the green material 111G having the largest drying rate overlap the scan region of the red material 111R and the scan region of the blue material 111B, it is made possible to avoid the amount of evaporation of the solvent evaporating from each liquid material 111 to be distributed unevenly depending on the location, hence, a uniform solvent atmosphere can be formed. This makes it possible to enhance the uniformity of the drying rates and makes it difficult for uneven drying to occur between each liquid material 111.

Still further, in the embodiment, for example, as shown in FIG. 10 to FIG. 12, each liquid material 111 is ejected such that the scan region of the red material 111R, the scan region of the green material 111G, and the scan region of the blue material 111B all overlap each other in the region W. This enables a uniform solvent atmosphere to be formed over the entire scan region. This makes it possible to enhance the uniformity of the drying rate of each liquid material 111 and makes it difficult for uneven drying to occur between each liquid material 111.

Electronic Equipment

Next, electronic equipment according to the invention will be described by taking a cell phone as an example.

Figure 14:
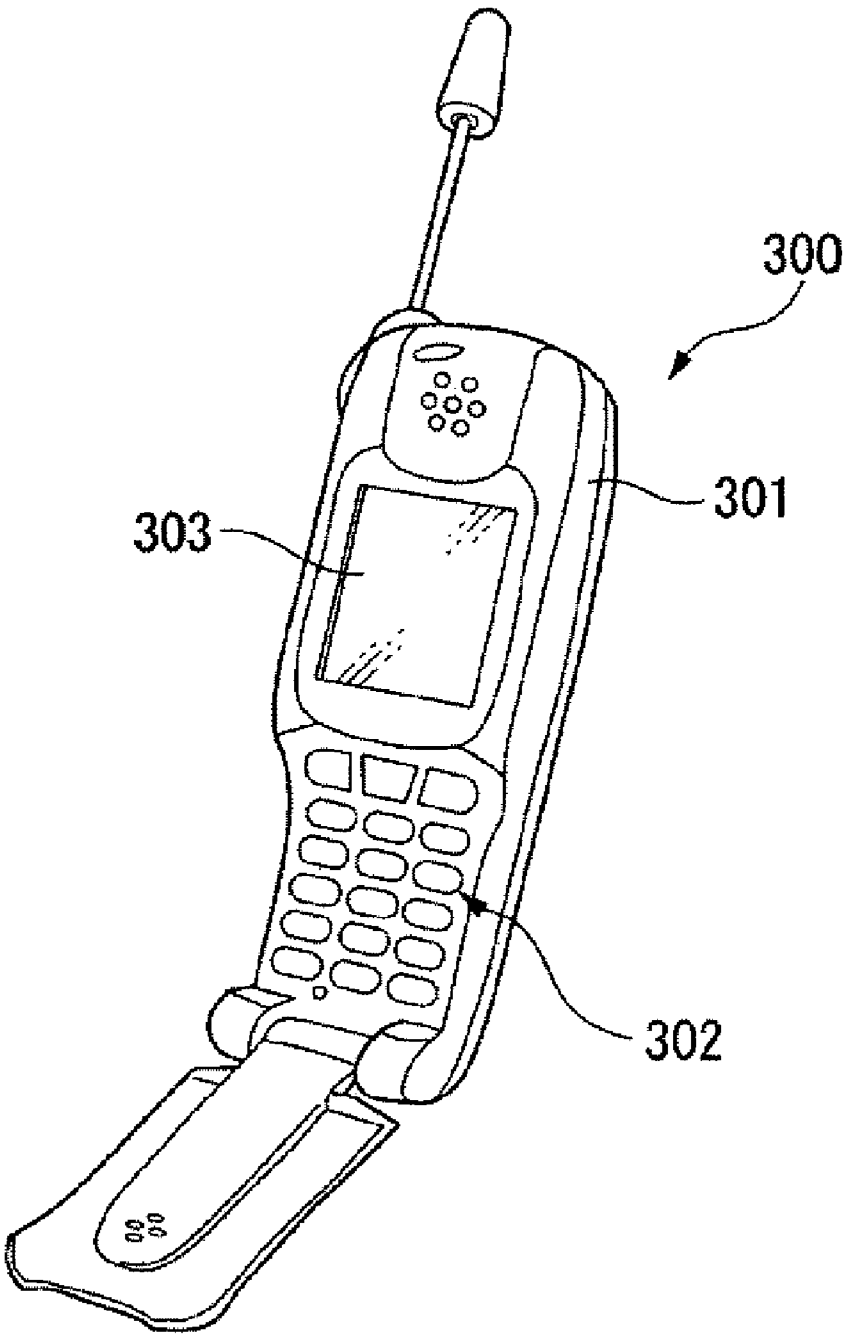
FIG. 14 is a perspective view showing configuration of electronic equipment according to the invention.

FIG. 14 is a perspective view showing an entire configuration of a cell phone 300.

The cell phone 300 includes a frame 301, an operating section 302 in which a plurality of operating buttons are provided, and a display section 303 displaying images, dynamic images, characters and the like. The liquid crystal device 1 according to the invention is mounted in the display section 303.

In this way, since the liquid crystal device 1 of superior quality providing uniform display is mounted, electronic equipment (cell phone 300) having excellent display performance can be obtained.

The technical range of the invention is not limited to the above-referenced embodiments but can be changed or modified as necessary within the scope of the spirit of the invention.

For example, in the above-referenced embodiment, as shown in FIG. 10 to FIG. 12, each liquid material 111 is ejected so that the scan region of the red material 111R, the scan region of the green material 111G, and the scan region of the blue material 111B all overlap each other. However, it is not limited to this.

A good example is that in the first-time scan, the red material 111R and the green material 111G are ejected on the region where the red material 111R and the green material 111G overlap each other, while, in the second-time scan, the green material 111G and the blue material 111B may be adapted to be ejected on the region where the green material 111G and the blue material 111B overlap each other.

Namely, not only in the case where the scan region of each liquid material 111 overlaps each other but also the case where the scan regions of two kinds of the liquid material 111 overlap each other, the invention is applicable.

Further, while description of the above-referenced embodiment refers to a case where the color filter layer 16 is formed on the color filter substrate 3 of the liquid crystal device 1 according to the invention, it is not limited to this. For example, the invention may be applied to a case of forming an organic layer (light-emitting layer and the like) on an substrate for organic EL device.

What is claimed is:

1. A liquid droplet ejection method comprising:

ejecting a plurality of liquid droplets of a first functional liquid, a second functional liquid, and a third functional liquid onto a substrate while scanning an ejection head relative to the substrate; and forming a color filter for a liquid crystal device with the first functional liquid, the second functional liquid, and the third functional liquid, wherein each of the functional liquids have a different drying rate and are ejected onto respective different positions in respective scanning directions during the same scanning operation, and scanning regions of each of the functional liquids at least partly overlap each other.

2. The liquid droplet ejection method according to claim 1, wherein at least one of the first, second, and third functional liquids has a drying rate greater than a drying rate of the remaining functional liquids and has a scanning region overlapping the scanning regions of the remaining functional liquids.

3. The liquid droplet ejection method according to claim 1, wherein each scanning region of the first, second, and third functional liquids overlap each other.

4. The liquid droplet ejection method according to claim 1, wherein the first, second, and third functional liquids correspond to a red material, a green material, and a blue material, respectively, for the color filter.

5. The liquid droplet ejection method according to claim 1, wherein the first functional liquid includes butylcalbitolacetate and a red inorganic pigment, the second functional liquid includes cyclohexanone, butyl acetate, and a green inorganic pigment, and the third functional liquid includes butylcalbitolacetate and a blue inorganic pigment.

6. The liquid droplet ejection method according to claim 5, wherein the second functional liquid has a drying rate greater than the first functional liquid and the third functional liquid.

* * * * *